(12) United States Patent
Kawagoe et al.

(10) Patent No.: US 9,080,778 B2
(45) Date of Patent: Jul. 14, 2015

(54) AIR-CONDITIONING HOT-WATER SUPPLY COMBINED SYSTEM

(75) Inventors: Tomokazu Kawagoe, Tokyo (JP); Koji Azuma, Tokyo (JP); Hirofumi Koge, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 226 days.

(21) Appl. No.: 13/518,610

(22) PCT Filed: Jan. 22, 2010

(86) PCT No.: PCT/JP2010/000370
§ 371 (c)(1),
(2), (4) Date: Jun. 22, 2012

(87) PCT Pub. No.: WO2011/089652
PCT Pub. Date: Jul. 28, 2011

(65) Prior Publication Data
US 2012/0255320 A1    Oct. 11, 2012

(51) Int. Cl.
*F24D 17/02*    (2006.01)
*F24H 6/00*    (2006.01)
(Continued)

(52) U.S. Cl.
CPC .......... *F24F 5/0017* (2013.01); *F24D 17/0005* (2013.01); *F24D 17/02* (2013.01);
(Continued)

(58) Field of Classification Search
CPC . F24D 17/0005; F24D 2200/12; F24D 17/02; F24D 2200/24; F24F 5/0017; F24F 3/06; F24H 6/00; F24H 4/02; Y02E 60/147; Y02B 10/70; F25B 29/00
USPC ........... 62/238.6, 238.7, 324.6, 175, 305, 335
See application file for complete search history.

(56) References Cited

U.S. PATENT DOCUMENTS 4,559,788 A * 12/1985 McFarlan ........................... 62/98
5,237,833 A    8/1993 Hayashida et al.
(Continued)

FOREIGN PATENT DOCUMENTS

JP    1-091364 A    4/1989
JP    08261599 A * 10/1996 .............. F25B 29/00
(Continued)

OTHER PUBLICATIONS

Office Action (Notice of Reasons for Rejection) dated Jun. 25, 2013, issued by the Japanese Patent Office in the corresponding Japanese Patent Application No. 2011-550721 and an English translation thereof. (3 pages).
(Continued)

*Primary Examiner* — Frantz Jules
*Assistant Examiner* — Martha Tadesse
(74) *Attorney, Agent, or Firm* — Buchanan Ingersoll & Rooney PC

(57) ABSTRACT

Provided is an air-conditioning hot-water supply combined system configured such that, in the case where all of load side units perform a cooling operation and a hot water load (heating load) is low during a cooling and heating mixed operation in a cooling cycle, an input of an air conditioning refrigerant block is reduced to increase the COP of the system. An air-conditioning hot-water supply combined system A reduces a target condensing temperature in a heat source unit in the case where a heating load in load side units and a hot water load in a hot water unit are less than a predetermined reference value in a cooling operation cycle state.

3 Claims, 5 Drawing Sheets

(51) Int. Cl.
*F25B 29/00* (2006.01)
*F24F 5/00* (2006.01)
*F24D 17/00* (2006.01)
*F24F 3/06* (2006.01)
*F24H 4/02* (2006.01)

(52) U.S. Cl.
CPC . *F24F 3/06* (2013.01); *F24H 4/02* (2013.01); *F24H 6/00* (2013.01); *F24D 2200/12* (2013.01); *F24D 2200/24* (2013.01); *Y02B 10/70* (2013.01); *Y02B 30/52* (2013.01); *Y02E 60/147* (2013.01)

(56) References Cited

U.S. PATENT DOCUMENTS

| | | | |
|---|---|---|---|
| 5,309,733 | A | 5/1994 | Hayashida et al. |
| 5,388,422 | A | 2/1995 | Hayashida et al. |
| 2006/0005558 | A1* | 1/2006 | Otake et al. .................. 62/260 |
| 2006/0254294 | A1* | 11/2006 | Shimamoto et al. ......... 62/238.7 |
| 2012/0151946 | A1* | 6/2012 | Decaestecker ................ 62/79 |

FOREIGN PATENT DOCUMENTS

| | | | | |
|---|---|---|---|---|
| JP | 8-291952 | A | | 11/1996 |
| JP | 08291952 | A * | 11/1996 | .............. F25B 29/00 |
| JP | 09210505 | A * | 8/1997 | .............. F25B 30/02 |
| JP | 2003166748 | A * | 6/2003 | ................ F24H 1/00 |
| JP | 2004-132647 | A | | 4/2004 |
| JP | 2004132647 | A * | 4/2004 | ................ F24H 1/00 |
| WO | WO 2009/098751 | A1 | | 8/2009 |

OTHER PUBLICATIONS

International Search Report (PCT/ISA/210) issued on Apr. 6, 2010, by the Japanese Patent Office as the International Searching Authority for International Application No. PCT/JP2010/000370.

Chinese Office Action dated May 28, 2014, issued by the Chinese Patent Office in corresponding Chinese Patent Application No. 201080061914.9, and English language translation of Office Action. (10 pages).

Office Action issued Dec. 31, 2014 by the Chinese Patent Office in corresponding Chinese Patent Application No. 201080061914.9, and an English language translation thereof.

* cited by examiner (a) [p-h DIAGRAM ILLUSTRATING TRANSITION IN
    HOT WATER SUPPLY REFRIGERANT BLOCK]

(b) [p-h DIAGRAM ILLUSTRATING TRANSITION IN
    AIR CONDITIONING REFRIGERANT BLOCK]

[p-h DIAGRAM ILLUSTRATING TRANSITION IN HOT WATER SUPPLY REFRIGERANT BLOCK]

[p-h DIAGRAM ILLUSTRATING TRANSITION IN AIR CONDITIONING REFRIGERANT BLOCK]

006# AIR-CONDITIONING HOT-WATER SUPPLY COMBINED SYSTEM

TECHNICAL FIELD

The present invention relates to an air-conditioning hot-water supply combined system equipped with a heat pump cycle, the system being capable of simultaneously providing an air conditioning load and a hot water load.

BACKGROUND ART

There has been an air-conditioning hot-water supply combined system capable of simultaneously providing a cooling load, a heating load, and a hot water load with such a configuration that a hot water supply refrigerant block including a compressor, a water heat exchanger, an expansion device, and a refrigerant-to-refrigerant heat exchanger is cascade-connected to part of a condenser of an air conditioning refrigerant block including a compressor, a cooling/heating switching valve, an outdoor heat exchanger, an expansion device, a plurality of indoor heat exchangers, and an accumulator. In such an air-conditioning hot-water supply combined system, it has been proposed such that heat discharged from the air conditioning refrigerant block is supplied to the hot water supply refrigerant block so that operation is carried out with high efficiently (refer to Patent Literature 1 and Patent Literature 2, for example).

CITATION LIST

Patent Literature

Patent Literature 1: Japanese Unexamined Patent Application Publication No. 2004-132647 (p. 1, FIG. 1, for example)
Patent Literature 2: Japanese Patent Application No. 1-91364 (p. 1, FIG. 2, for example)

SUMMARY OF INVENTION

Technical Problem

With the operating method of the air-conditioning hot-water supply combined system disclosed in Patent Literature 1, an input of the compressor in the heat source unit (outdoor unit) side becomes excessive when condensing temperature control is carried out with the same control for the air conditioning for heating in a case in which the cooling load is large and the hot water load is small. Accordingly, since the system input is increased, there may be cases in which a high efficient operation cannot be achieved, resulting in aggravation of system COP (coefficient of performance). The same applies to an air conditioning refrigerant block with no hot water facility.

Methods of reducing a heating capacity in a cooling/heating switching type apparatus includes a method of reducing the circulation amount of refrigerant flowing through a refrigerant circuit (a method of reducing the opening degree of an expansion device) and a method of reducing a refrigerant condensing temperature so that the difference between the refrigerant condensing temperature and an indoor suction temperature is reduced. In the above methods of reducing the heating capacity, as the load becomes low, the driving frequency of the compressor becomes low in the former method and the input to the outdoor unit can be reduced in the latter method due to the drop of high pressure. However, in a case of a cooling/heating selectable type, when the cooling load is high, it is anticipated that the cooling capacity will drop and that system COP will drop in the former method. Further, in the latter method, same as the air-conditioning hot-water supply combined system disclosed in Patent Literature 1, the system COP may drop.

The present invention has been made to solve the above-described disadvantages and an object of the present invention is to provide an air-conditioning hot-water supply combined system that is configured to improve the system COP by reducing the input of an air conditioning refrigerant block when all the load side units are in cooling operation and when the hot water load (heating load) is small, during a cooling and heating mixed operation in a cooling cycle.

Solution to Problem

The present invention provides an air-conditioning hot-water supply combined system including at least one heat source unit including at least a heat source side compressor and a heat source side heat exchanger; a plurality of load side units connected in parallel to the heat source unit, the load side units each including at least a load side heat exchanger; a hot water unit connected in parallel to the heat source unit, the hot water unit including at least a refrigerant-to-refrigerant heat exchanger, a water heat exchanger, and a hot water unit side compressor; and at least one relay unit disposed between the heat source unit, and the load side units, and the hot water unit, the relay unit being configured to transfer heating energy or cooling energy generated in the heat source unit to the load side units and the hot water unit, in which in the case where a heating load in the load side units and a hot water load in the hot water unit are less than a predetermined reference value in a cooling operation cycle state, a target condensing temperature in the heat source unit is reduced.

Advantageous Effects of Invention

Since the air-conditioning hot-water supply combined system according to the present invention can reduce an input of the heat source side compressor which is the most dominant input over an input of the system, the system input is reduced even when an input of the hot water unit side compressor is increased, and, thus, the COP of the system can be increased.

DESCRIPTION OF EMBODIMENT

Embodiment of the present invention will be described below with reference to the drawings.

Figure 1:
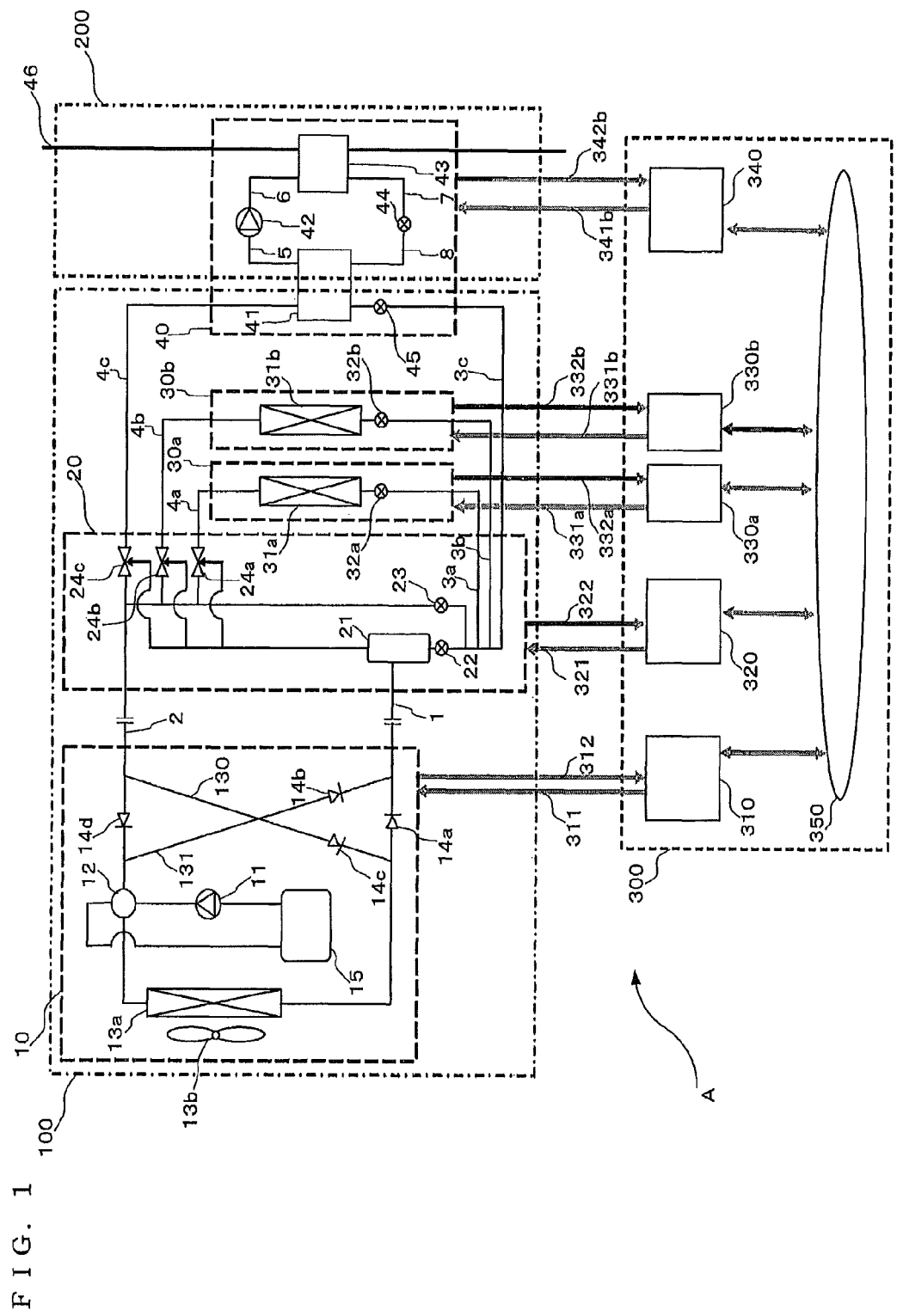
FIG. 1 is a refrigerant circuit diagram illustrating an exemplary refrigerant circuit configuration of an air-conditioning hot-water supply combined system according to Embodiment of the present invention.
Figure 2:
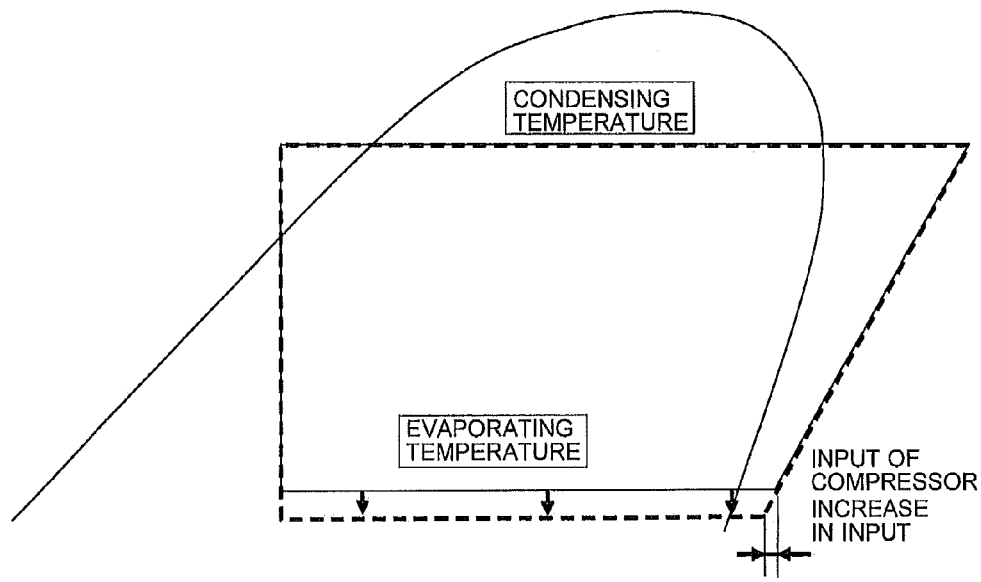
FIG. 2 includes a p-h diagram illustrating transition of a refrigerant state in an air conditioning refrigerant block and a p-h diagram illustrating the same in a hot water supply refrigerant block.
Figure 2:
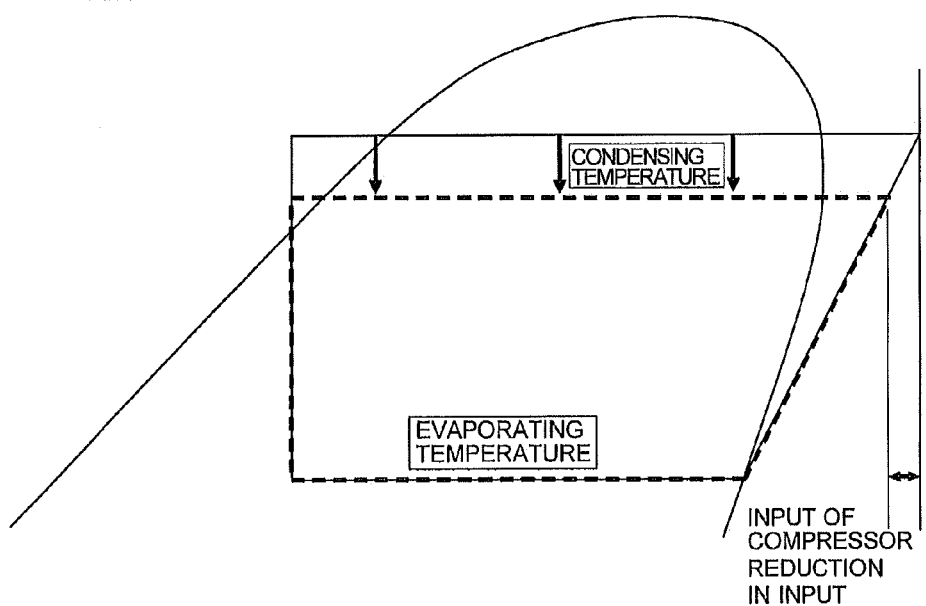

FIG. 1 is a refrigerant circuit diagram illustrating an exemplary refrigerant circuit configuration of an air-conditioning hot-water supply combined system A according to Embodiment of the present invention. FIG. 2 includes a p-h diagram illustrating transition of a refrigerant state in an air conditioning refrigerant block 100 and a p-h diagram illustrating the same in a hot water supply refrigerant block 200. A refrigerant circuit configuration and an operation of the air-conditioning hot-water supply combined system A will be described with reference to FIGS. 1 and 2. This air-conditioning hot-water supply combined system A includes a combination of two refrigeration cycles (heat pump cycles), that is, the air conditioning refrigerant block 100 and the hot water supply refrigerant block 200. It should be noted that the dimensional relationships of components in FIG. 1 and other subsequent figures may be different from the actual ones.

The air-conditioning hot-water supply combined system A according to Embodiment is installed in, for example, a building, an apartment, or a hotel and is capable of simultaneously supplying a cooling load, a heating load, and a hot water load using the refrigeration cycles through which refrigerants (an air conditioning refrigerant and a hot water supply refrigerant) are circulated. The air-conditioning hot-water supply combined system A includes, at least, a heat source unit (outdoor unit) 10, a cooling/heating branch unit (relay unit) 20, load side units (indoor units) 30, and a hot water unit 40.

[Air Conditioning Refrigerant Block 100]

{Configuration}

The air conditioning refrigerant block 100 includes the heat source unit 10, the load side units 30 (a load side unit 30a, a load side unit 30b), the cooling/heating branch unit 20, and a portion of the hot water unit 40. Among these components, the load side units 30 and the hot water unit 40 are connected in parallel to the heat source unit 10 through the cooling/heating branch unit 20. The cooling/heating branch unit 20, which is disposed between the heat source unit 10, each of the load side units 30, and the hot water unit 40, switches flow directions of the air conditioning refrigerant such that each of the load side units 30 and the hot water unit 40 is allowed to exert its function.

The heat source unit 10 and the cooling/heating branch unit 20 are connected through a high pressure main piping 1, serving as a refrigerant piping, and a low pressure main piping 2, serving as a refrigerant piping, such that the units communicate with each other. The cooling/heating branch unit 20 and the load side unit 30a are connected through a liquid branch piping 3a, serving as a refrigerant piping, and a gas branch piping 4a, serving as a refrigerant piping, such that the units communicate with each other. The cooling/heating branch unit 20 and the load side unit 30b are connected through a liquid branch piping 3b, serving as a refrigerant piping, and a gas branch piping 4b, serving as a refrigerant piping, such that the units communicate with each other. The cooling/heating branch unit 20 and the hot water unit 40 are connected through a liquid branch piping 3c, serving as a refrigerant piping, and a gas branch piping 4c, serving as a refrigerant piping, such that the units communicate with each other.

{Heat Source Unit 10}

The heat source unit 10 has a function of supplying heating energy or cooling energy to the load side units 30 and the hot water unit 40 through the cooling/heating branch unit 20. This heat source unit 10 includes a compressor (heat source side compressor) 11, a four-way valve 12, serving as flow switching means, a heat source side heat exchanger 13a, and an accumulator 15, which are connected in series. The heat source unit 10 further includes an air-sending device 13b, such as a fan, for supplying air to the heat source side heat exchanger 13a such that the device is disposed near the heat source side heat exchanger 13a.

The compressor 11 is configured to suck the air conditioning refrigerant flowing through the low pressure main piping 2 and compress the air conditioning refrigerant to a high-temperature high-pressure state. The compressor 11 may be any that is capable of compressing the sucked air conditioning refrigerant to a high-pressure state and is not limited to any particular type of compressor. For example, the compressor 11 may be any of various types of compressors, such as reciprocal, rotary, scroll, and screw compressors. Desirably, this compressor 11 may be of a type whose rotation speed can be variably controlled by an inverter.

The four-way valve 12 is configured to switch flow directions of the air conditioning refrigerant in accordance with a requested operation mode. The heat source side heat exchanger 13a is configured to function as a radiator (condenser) in a cooling cycle, function as an evaporator in a heating cycle, exchange heat between the air supplied from the air-sending device 13b and the air conditioning refrigerant, and condense and liquefy or evaporate and gasify the air conditioning refrigerant. Furthermore, in the case where a cooling and heating mixed operation is performed in the cooling cycle, control needs to be carried out so that the refrigerant is condensed to a state entering a gas-liquid towphase region during condensation. The accumulator 15 is disposed on the suction side of the compressor 11 and is configured to retain excess air conditioning refrigerant. Note that the accumulator 15 may be any container capable of storing excess air conditioning refrigerant.

The heat source unit 10 further includes a check valve 14a configured to allow the air conditioning refrigerant to flow only in a predetermined direction (the direction from the heat source unit 10 to the cooling/heating branch unit 20) in the high pressure main piping 1 between the heat source side heat exchanger 13a and the cooling/heating branch unit 20 and a check valve 14d configured to allow the air conditioning refrigerant to flow only in a predetermined direction (the direction from the cooling/heating branch unit 20 to the heat source unit 10) in the low pressure main piping 2 between the four-way valve 12 and the cooling/heating branch unit 20.

The high pressure main piping 1 and the low pressure main piping 2 are connected by a first connecting piping 130 that connects the upstream side of the check valve 14a to the upstream side of the check valve 14d and a second connecting piping 131 that connects the downstream side of the check valve 14a to the downstream side of the check valve 14d. A check valve 14c configured to allow the air conditioning refrigerant to flow only in the direction from the low pressure main piping 2 to the high pressure main piping 1 is disposed in the first connecting piping 130. A check valve 14b configured to allow the air conditioning refrigerant to flow only in the direction from the low pressure main piping 2 to the high pressure main piping 1 is disposed in the second connecting piping 131.

{Load Side Units 30}

Each load side unit 30 has a function of receiving heating energy or cooling energy from the heat source unit 10 to bear a heating load or a cooling load. Each load side unit 30 includes a load side expansion device 32 and a load side heat exchanger (indoor heat exchanger) 31 which are connected in series. Note that although FIG. 1 illustrates an exemplary state in which two load side units 30 are mounted, the number of load side units is not particularly limited. Furthermore, each load side unit 30 may further include an air-sending device, such as a fan, for supplying air to the load side heat exchanger 31 such that the device is disposed near the load side heat exchanger 31.

The load side expansion device 32 has functions of a reducing valve and an expansion valve and is configured to depressurize and expand the air conditioning refrigerant. This load side expansion device 32 may desirably be a component having a variably controllable opening degree, for example, minute flow control means, such as an electronic expansion valve, or inexpensive refrigerant flow control means, such as a capillary tube. The load side heat exchanger 31 is configured to function as a radiator (condenser) in the heating cycle, function as an evaporator in the cooling cycle, exchange heat between the air supplied from the air-sending device (not illustrated) and the air conditioning refrigerant, and condense and liquefy or evaporate and gasify the air conditioning refrigerant.

{Cooling/Heating Branch Unit 20}

The cooling/heating branch unit 20 connects each use side unit (the load side units 30, the hot water unit 40) to the heat source unit 10 and has a function of alternatively opening or closing each one of solenoid valves 24a, 24b, and 24c to determine whether the load side heat exchanger 31 is to be a radiator or evaporator and to determine whether a refrigerant-to-refrigerant heat exchanger 41 is to be a water cooler or a water heater. This cooling/heating branch unit 20 includes, at least, a gas-liquid separator 21, the solenoid valve 24a, the solenoid valve 24b, the solenoid valve 24c, an expansion device 22, and a bypass expansion device 23.

The solenoid valve 24a is disposed such that one of three ways is connected to the low pressure main piping 2, another one of the three ways is connected to the gas branch piping 4a, and the other one of the three ways is connected to the gas-liquid separator 21. The solenoid valve 24b is disposed such that one of three ways is connected to the low pressure main piping 2, another one of the three ways is connected to the gas branch piping 4b, and the other one of the three ways is connected to the gas-liquid separator 21. The solenoid valve 24c is disposed such that one of three ways is connected to the low pressure main piping 2, another one of the three ways is connected to the gas branch piping 4c, and the other one of the three ways is connected to the gas-liquid separator 21.

The gas-liquid separator 21 is configured to separate the air conditioning refrigerant into a gas refrigerant and a liquid refrigerant and is disposed in the high pressure main piping 1 such that one end of the separator is connected to the solenoid valves (the solenoid valve 24a, the solenoid valve 24b, the solenoid valve 24c) through refrigerant pipings and the other end thereof is connected to the expansion device 22. The expansion device 22 is disposed downstream of the gas-liquid separator 21 in the flow direction of the liquid refrigerant flowing therefrom and is configured to depressurize and expand the air conditioning refrigerant. The bypass expansion device 23 is disposed in a refrigerant piping, which is branched off downstream of the expansion device 22 and is connected to the low pressure main piping 2, and is configured to depressurize and expand the air conditioning refrigerant. Each of the expansion device 22 and the bypass expansion device 23 may be a component having a variably controllable opening degree, for example, minute flow control means, such as an electronic expansion valve, or inexpensive refrigerant flow control means, such as a capillary tube.

{Portion of Hot Water Unit 40}

A portion of the hot water unit 40 has a function of supplying heating energy or cooling energy from the heat source unit 10 to the hot water supply refrigerant block 200 through the refrigerant-to-refrigerant heat exchanger 41. The portion of the hot water unit includes the refrigerant-to-refrigerant heat exchanger 41 on the air conditioning refrigerant side and an air-conditioning-refrigerant-block side expansion device 45 and constitutes a part of the air conditioning refrigerant block 100. In other words, the air conditioning refrigerant block 100 and the hot water supply refrigerant block 200 are connected through the refrigerant-to-refrigerant heat exchanger 41.

The refrigerant-to-refrigerant heat exchanger 41 is configured to exchange heat between the hot water supply refrigerant circulating through the hot water supply refrigerant block 200 and the air conditioning refrigerant circulating through the air conditioning refrigerant block 100. The air-conditioning-refrigerant-block side expansion device 45 has functions of a reducing valve and an expansion valve in a manner similar to the load side expansion devices (the load side expansion device 32a, the load side expansion device 32b) and is configured to depressurize and expand the air conditioning refrigerant. This air-conditioning-refrigerant-block side expansion device 45 may be a component having a variably controllable opening degree, for example, minute flow control means, such as an electronic expansion valve, or inexpensive refrigerant flow control means, such as a capillary tube.

As described above, the air conditioning refrigerant block 100 is established such that the compressor 11, the four-way valve 12, each load side heat exchanger 31, each load side expansion device 32, and the heat source side heat exchanger 13a are connected in series, the compressor 11, the four-way valve 12, the refrigerant-to-refrigerant heat exchanger 41, the air-conditioning-refrigerant-block side expansion device 45, and the heat source side heat exchanger 13a are connected in series, each load side heat exchanger 31 is connected in parallel to the refrigerant-to-refrigerant heat exchanger 41 through the cooling/heating branch unit 20, and the air conditioning refrigerant is circulated therethrough.

{Operations}

Operation modes carried out by the air-conditioning hot-water supply combined system A includes a cooling only operation mode in which all of the operating load side units 30 (the load side unit 30a, the load side unit 30b) in a cooling operation cycle state perform a cooling operation, a heating only operation mode in which all of the operating load side units 30 in a heating operation cycle state perform a heating operation, a cooling main operation mode in which a cooling load is higher during the cooling and heating mixed operation in the cooling operation cycle state, and a heating main operation mode in which a heating load is higher during the cooling and heating mixed operation in the heating operation cycle state. Note that in the following description, it is assumed that the load side unit 30a provides a cooling load and the load side unit 30b provides a heating load in the cooling main operation mode and the heating main operation mode.

(Cooling Only Operation Mode)

A low-pressure gas refrigerant is sucked into the compressor 11. The refrigerant compressed into a high-temperature high-pressure air conditioning refrigerant in the compressor 11 is discharged from the compressor 11, passes through the four-way valve 12, and flows into the heat source side heat exchanger 13a. The high-pressure gas refrigerant that has flowed into the heat source side heat exchanger 13a transfers heat by exchanging heat with the air supplied from the air-sending device 13b and turns into a high-pressure liquid refrigerant. The refrigerant passes through the check valve 14a and flows out of the heat source unit 10 through the high pressure main piping 1. The high-pressure liquid refrigerant that has flowed out of the heat source unit 10 flows into the gas-liquid separator 21 in the cooling/heating branch unit 20.

The high-pressure liquid refrigerant that has flowed into the gas-liquid separator 21 flows out of the gas-liquid separator 21, passes through the expansion device 22, and is diverted to the liquid branch piping 3a and the liquid branch piping 3b. The refrigerant diverted to the liquid branch piping 3a and the liquid branch piping 3b flow into the load side unit 30a and the load side unit 30b, respectively. The refrigerant that has flowed into the load side unit 30a and the load side unit 30b is depressurized in each of the load side expansion devices 32a and 32b such that the refrigerant turns into a low-pressure two-phase gas-liquid refrigerant or a low-pressure liquid refrigerant, and flows into the load side heat exchangers 31a and 31b, respectively.

The low-pressure refrigerant flowing into the load side heat exchangers 31a and 31b is evaporated in the load side heat exchangers 31a and 31b such that the refrigerant turns into a low-pressure gas refrigerant and flows out of the load side heat exchangers 31a and 31b, respectively. The low-pressure gas refrigerant that has flowed out of the load side heat exchangers 31a and 31b flows through the respective gas branch pipings 4a and 4b, passes through the respective solenoid valves 24a and 24b, and after that, is merged. The resultant refrigerant flows out of the cooling/heating branch unit 20 through the low pressure main piping 2. The low-pressure gas refrigerant that has flowed out of the cooling/heating branch unit 20 flows into the heat source unit 10, passes through the check valve 14d, the four-way valve 12, and the accumulator 15, and is sucked into the compressor 11 again.

(Heating Only Operation Mode)

A low-pressure gas refrigerant is sucked into the compressor 11. The refrigerant compressed into a high-temperature high-pressure air conditioning refrigerant in the compressor 11 is discharged from the compressor 11, passes through the four-way valve 12 and the check valve 14b, and flows out of the heat source unit 10 through the high pressure main piping 1. The high-pressure gas refrigerant that has flowed out of the heat source unit 10 flows into the gas-liquid separator 21 in the cooling/heating branch unit 20. The high-pressure gas refrigerant that has flowed into the gas-liquid separator 21 flows out of the gas-liquid separator 21, is then diverted, flows through the solenoid valves 24a and 24b to the gas branch pipings 4a and 4b, respectively.

The refrigerant that has flowed through the gas branch piping 4a and the gas branch piping 4b flows into the load side units 30a and 30b, respectively. The refrigerant that has flowed into the load side unit 30a and the load side unit 30b flows into the load side heat exchangers 31a and 31b, respectively. The high-pressure gas refrigerant flowing into the load side heat exchanger 31a and the load side heat exchanger 31b condenses (transfers heat) in the respective load side heat exchangers 31a and 31b such that the refrigerant turns into a high-pressure liquid refrigerant. The refrigerant flows out of the load side heat exchangers 31a and 31b. The high-pressure liquid refrigerant that has flowed out of the load side heat exchanger 31a and the load side heat exchanger 31b is depressurized through the respective load side expansion devices 32a and 32b such that the refrigerant turns into a low-pressure two-phase gas-liquid refrigerant or a low-pressure liquid refrigerant. The refrigerant flows out of the load side units 30a and 30b through the liquid branch pipings 3a and 3b, respectively.

The low-pressure refrigerant that has flowed out of the load side unit 30a through the liquid branch piping 3a and that flowing out of the load side unit 30b through the liquid branch piping 3b is merged. The resultant refrigerant passes through the bypass expansion device 23 and flows out of the cooling/heating branch unit 20 through the low pressure main piping 2. The low-pressure refrigerant that has flowed out of the cooling/heating branch unit 20 flows into the heat source unit 10, passes through the check valve 14c, and flows into the heat source side heat exchanger 13a. The low-pressure refrigerant that has flowed into the heat source side heat exchanger 13a exchanges heat with the air supplied from the air-sending device 13b such that it turns into a low-pressure gas refrigerant, and flows out of the heat source side heat exchanger 13a. The refrigerant that has flowed out of the heat source side heat exchanger 13a passes through the four-way valve 12 and the accumulator 15 and is sucked into the compressor 11 again.

(Cooling Main Operation Mode)

A low-pressure gas refrigerant is sucked into the compressor 11. The refrigerant compressed into a high-temperature high-pressure air conditioning refrigerant in the compressor 11 is discharged from the compressor 11, passes through the four-way valve 12, and flows into the heat source side heat exchanger 13a. The high-pressure gas refrigerant that has flowed into the heat source side heat exchanger 13a transfers heat by exchanging heat with the air supplied from the air-sending device 13b and turns into a high-pressure two-phase gas-liquid refrigerant. The refrigerant passes through the check valve 14a and flows out of the heat source unit 10 through the high pressure main piping 1. The high-pressure two-phase refrigerant that has flowed out of the heat source unit 10 flows into the gas-liquid separator 21 in the cooling/heating branch unit 20.

The high-pressure two-phase refrigerant that has flowed into the gas-liquid separator 21 is separated into a high-pressure saturated gas refrigerant and a high-pressure saturated liquid refrigerant and flows out of the gas-liquid separator 21. The high-pressure saturated gas refrigerant that has flowed out of the gas-liquid separator 21 passes through the solenoid valve 24b, flows through the gas branch piping 4b, and flows into the load side unit 30b. The high-pressure gas refrigerant that has flowed into the load side unit 30b is condensed in the load side unit 30b such that it turns into a high-pressure liquid refrigerant. This high-pressure liquid refrigerant is depressurized by the load side expansion device 32b, so that it turns into a medium-pressure two-phase gas-liquid refrigerant or a medium-pressure liquid refrigerant. The refrigerant flows through the liquid branch piping 3b and is reused as a refrigerant used for cooling.

Meanwhile, the high-pressure saturated liquid refrigerant that has flowed out of the gas-liquid separator 21 passes through the expansion device 22, merges with the refrigerant that has flowed through the liquid branch piping 3b, and flows into the load side unit 30a. The refrigerant that has flowed into the load side unit 30a is depressurized in the load side expansion device 32a such that the refrigerant turns into a low-pressure two-phase gas-liquid refrigerant or a low-pressure liquid refrigerant, and flows into the load side heat exchanger 31a. The low-pressure refrigerant that has flowed into the load side heat exchanger 31a evaporates in the load side heat exchanger 31a, turns into a low-pressure gas refrigerant, and flows out of the load side heat exchanger 31a. The low-pressure gas refrigerant that has flowed out of the load side heat exchanger 31a flows through the gas branch piping 4a, passes through the solenoid valve 24a, and flows out of the cooling/heating branch unit 20 through the low pressure main piping 2.

At this time, if the amount of liquid refrigerant accumulated in a liquid line (the load side heat exchanger 31b, the liquid branch piping 3b, the liquid branch piping 3a, the load side heat exchanger 31a, the expansion device 22, and the bypass expansion device 23) becomes large, a pressure in the liquid line is risen, and, consequently, the difference between the pressure in the liquid line and a pressure on a primary side of the load side unit 30b becomes small. Accordingly, the circulation amount of refrigerant flowing through the load side unit 30b becomes small, thus reducing heating capacity. In the air-conditioning hot-water supply combined system A, therefore, in order to release the liquid accumulated in the liquid line, the liquid accumulating in the liquid line is made to flow in the low pressure main piping 2 by appropriate opening of the bypass expansion device 23, thus, achieving control of the pressure in the liquid line. In the low pressure main piping 2, therefore, the low-pressure gas refrigerant flowing from the load side unit 30a mixes with the low-pressure liquid refrigerant or the low-pressure two-phase gas-liquid refrigerant flowing from the bypass expansion device 23. Accordingly, a low-pressure two-phase gas-liquid refrigerant flows in the low pressure main piping 2.

The low-pressure two-phase gas-liquid refrigerant that has flowed out of the cooling/heating branch unit 20 through the low pressure main piping 2 flows into the heat source unit 10, passes through the check valve 14d, the four-way valve 12, and the accumulator 15, and is sucked into the compressor 11 again.

(Heating Main Operation Mode)

A low-pressure gas refrigerant is sucked into the compressor 11. The refrigerant compressed into a high-temperature high-pressure air conditioning refrigerant in the compressor 11 is discharged from the compressor 11, passes through the four-way valve 12 and the check valve 14b, and flows out of the heat source unit 10 through the high pressure main piping 1. The high-pressure gas refrigerant that has flowed out of the heat source unit 10 flows into the gas-liquid separator 21 in the cooling/heating branch unit 20. The high-pressure gas refrigerant that has flowed into the gas-liquid separator 21 flows out of the gas-liquid separator 21, flows through the solenoid valve 24b to the gas branch piping 4b.

The high-pressure gas refrigerant that has flowed through the gas branch piping 4b flows into the load side unit 30b. The refrigerant that has flowed into the load side unit 30b flows into the load side heat exchanger 31b. The high-pressure gas refrigerant that has flowed into the load side heat exchanger 31b condenses (transfers heat) in the load side heat exchanger 31b, turns into a high-pressure liquid refrigerant, and flows out of the load side heat exchanger 31b. The high-pressure liquid refrigerant that has flowed out of the load side heat exchanger 31b is depressurized by the load side expansion device 32b such that it turns into a medium-pressure two-phase gas-liquid refrigerant or a medium-pressure liquid refrigerant. The refrigerant flows out of the load side unit 30b through the liquid branch piping 3b.

The medium-pressure refrigerant that has flowed out of the load side unit 30b through the liquid branch piping 3b flows through the liquid branch piping 3a into the load side unit 30a. The medium-pressure refrigerant that has flowed into the load side unit 30a is depressurized in the load side expansion device 32a such that the refrigerant turns into a low-pressure two-phase gas-liquid refrigerant or a low-pressure liquid refrigerant, and flows into the load side heat exchanger 31a. The low-pressure refrigerant that has flowed into the load side heat exchanger 31a evaporates in the load side heat exchanger 31a, turns into a low-pressure gas refrigerant, and flows out of the load side heat exchanger 31a. The low-pressure gas refrigerant that has flowed out of the load side heat exchanger 31a flows through the gas branch piping 4a, passes through the solenoid valve 24a, and flows out of the cooling/heating branch unit 20 through the low pressure main piping 2.

At this time, if the amount of liquid refrigerant accumulated in a liquid line (the load side heat exchanger 31b, the liquid branch piping 3b, the liquid branch piping 3a, the load side heat exchanger 31a, the expansion device 22, and the bypass expansion device 23) becomes large, a pressure in the liquid line is risen, and, consequently, the difference between the pressure in the liquid line and a pressure on a primary side of the load side unit 30b becomes small. Accordingly, the circulation amount of refrigerant flowing through the load side unit 30b becomes small, thus reducing heating capacity. In the air-conditioning hot-water supply combined system A, therefore, in order to release the liquid accumulated in the liquid line, the liquid accumulating in the liquid line is made to flow in the low pressure main piping 2 by appropriate opening of the bypass expansion device 23, thus, achieving control of the pressure in the liquid line. In the low pressure main piping 2, therefore, the low-pressure gas refrigerant flowing from the load side unit 30a mixes with the low-pressure liquid refrigerant or the low-pressure two-phase gas-liquid refrigerant flowing from the bypass expansion device 23. Accordingly, a low-pressure two-phase gas-liquid refrigerant flows in the low pressure main piping 2.

The low-pressure two-phase gas-liquid refrigerant that has flowed out of the cooling/heating branch unit 20 through the low pressure main piping 2 flows into the heat source unit 10, passes through the check valve 14c, and flows into the heat source side heat exchanger 13a. The low-pressure two-phase gas-liquid refrigerant that has flowed into the heat source side heat exchanger 13a exchanges heat with the air supplied from the air-sending device 13b such that it turns into a low-pressure gas refrigerant, and flows out of the heat source side heat exchanger 13a. The refrigerant that has flowed out of the heat source side heat exchanger 13a passes through the four-way valve 12 and the accumulator 15 and is sucked into the compressor 11 again.

[Hot Water Supply Refrigerant Block 200]

{Configuration}

The hot water supply refrigerant block 200 includes the remaining portion of the hot water unit 40 which does not constitute the air conditioning refrigerant block 100 and a portion of a water circuit 46 which exchanges heat through a water heat exchanger 43.

{Remaining Portion of Hot Water Unit 40}

The remaining portion of the hot water unit 40 has a function of supplying heating energy or cooling energy received through the refrigerant-to-refrigerant heat exchanger 41 to the water circuit 46 via the water heat exchanger 43. The remaining portion of the hot water unit serves as part of the hot water supply refrigerant block and includes a hot water unit side compressor 42, the water heat exchanger 43, a hot-water-supply-refrigerant-block side expansion device 44, and a portion of the refrigerant-to-refrigerant heat exchanger 41 on the hot water supply refrigerant side.

In other words, the hot water unit 40 includes two kinds of refrigerant blocks. The hot water unit 40 on the air conditioning refrigerant block 100 side includes the air-conditioning-refrigerant-block side expansion device 45 disposed between the liquid branch piping 3c and the gas branch piping 4c and the air-conditioning-refrigerant-block side part of the refrigerant-to-refrigerant heat exchanger 41, which are connected to each other. The hot water unit 40 on the hot water supply refrigerant block 200 side includes the hot water unit side compressor 42, the water heat exchanger 43, the hot-watersupply-refrigerant-block side expansion device 44, and the refrigerant-to-refrigerant heat exchanger 41 on the hot-water-supply-refrigerant side such that these components are sequentially connected through gas pipings (a gas piping 5, a gas piping 6), serving as refrigerant pipings, and liquid pipings (a liquid piping 7, a liquid piping 8), serving as refrigerant pipings.

The hot water unit side compressor 42 is configured to suck the hot water supply refrigerant and compress the hot water supply refrigerant to a high-temperature high-pressure state. This hot water unit side compressor 42 may be of a type whose rotation speed can be variably controlled by an inverter or may be of a type whose rotation speed is fixed. The hot water unit side compressor 42 may be any that is capable of compressing the sucked hot water supply refrigerant to a high-pressure state and is not limited to any particular type of compressor. For example, the hot water unit side compressor 42 may be any of various types of compressors, such as reciprocal, rotary, scroll, and screw compressors.

The water heat exchanger 43 is configured to exchange heat between a heat medium (fluid such as water or antifreeze) circulating through the water circuit 46 and the hot water supply refrigerant circulating through the hot water supply refrigerant block 200. In other words, the hot water supply refrigerant block 200 and the water circuit 46 are connected through the water heat exchanger 43. The hot-water-supply-refrigerant-block side expansion device 44 has functions of a reducing valve and an expansion valve and is configured to depressurize and expand the hot water supply refrigerant. This hot-water-supply-refrigerant-block side expansion device 44 may be a component having a variably controllable opening degree, for example, minute flow control means, such as an electronic expansion valve, or inexpensive refrigerant flow control means, such as a capillary tube. As described above, the refrigerant-to-refrigerant heat exchanger 41 is configured to exchange heat between the hot water supply refrigerant circulating through the hot water supply refrigerant block 200 and the air conditioning refrigerant circulating through the air conditioning refrigerant block 100.

{Operations}

The hot water supply refrigerant compressed to a high-temperature high-pressure in the hot water unit side compressor 42 is discharged from the hot water unit side compressor 42 and flows through the gas piping 6 into the water heat exchanger 43. In this water heat exchanger 43, water circulating in the water circuit 46 is heated by the heat transfer of the incoming hot water supply refrigerant. The hot water supply refrigerant flowing out of the water heat exchanger 43 flows through the liquid piping 7 into the hot-water-supply-refrigerant-block side expansion device 44, where the refrigerant is expanded to a temperature at or below an outlet temperature of the refrigerant-to-refrigerant heat exchanger 41 in the air conditioning refrigerant block 100. The expanded hot water supply refrigerant flows through the liquid piping 8 into the refrigerant-to-refrigerant heat exchanger 41, where the refrigerant receives heat from the air conditioning refrigerant flowing through the air conditioning refrigerant block and then evaporates.

The hot water supply refrigerant flowing out of the refrigerant-to-refrigerant heat exchanger 41 flows through the gas piping 5 and returns to the hot water unit side compressor 42.

{Portion of Water Circuit 46}

The water circuit 46 includes a pump and a hot water storage tank which are not illustrated. In other words, the water circuit 46 is established by circulating water heated or cooled through the water heat exchanger 43. Note that water pipings constituting the water circuit 46 may include, for example, a copper pipe, a stainless steel pipe, a steel pipe, and a polyvinyl chloride pipe. While the water circuit 46 is described herein, fluid is not limited to water. Antifreeze or the like may be circulated.

Incidentally, the air-conditioning hot-water supply combined system A includes control means 300. This control means 300 has a function of controlling the entirety of the system including the air conditioning refrigerant block 100 and the hot water supply refrigerant block 200 and includes heat-source-unit control means 310, cooling/heating-branch-unit control means 320, load-side-unit control means 330 (load-side-unit control means 330a, load-side-unit control means 330b), and hot-water-unit control means 340.

As regards allocation of the control means, autonomous distributed cooperative control may be adopted such that corresponding control means is allocated to each unit in which the units perform control independently of each other. Alternatively, any one of the units may have all of the control means and the unit having all of the control means may send a control command to other units by means of communication or the like. For example, the heat source unit 10 may have the heat-source-unit control means 310, the cooling/heating-branch-unit control means 320, and the load-side-unit control means 330, and the hot water unit 40 may have the hot-water-unit control means 340 such that the heat source unit 10 and the hot water unit 40 can perform control independently of each other. The control means can transmit information to each other by wireless or wired communication means 350.

The heat-source-unit control means 310 has a function of controlling a pressure state of the refrigerant and a temperature state thereof in the air conditioning refrigerant block 100. Specifically, the heat-source-unit control means 310 has functions of controlling a driving frequency of the compressor 11, changing the area of heat exchange in the heat source side heat exchanger 13a, controlling the fan rotation speed of the air-sending device 13b, and switching the four-way valve 12.

The cooling/heating-branch-unit control means 320 has functions of controlling the opening degree of the expansion device 22 and that of the bypass expansion device 23 in the cooling/heating branch unit 20 and opening and closing of the solenoid valves (the solenoid valve 24a, the solenoid valve 24b, the solenoid valve 24c).

Each load-side-unit control means 330 has functions of controlling the degree of superheat of the load side unit 30 during the cooling operation and the degree of subcooling of the load side unit 30 during the heating operation. Specifically, the load-side-unit control means 330 has functions of changing the area of heat exchange in the load side heat exchanger 31, controlling the fan rotation speed of the air-sending device (not illustrated), and controlling the opening degree of the load side expansion device 32.

The hot-water-unit control means 340 has a function of performing centralized control of the hot water supply refrigerant block 200. Specifically, the hot-water-unit control means 340 has functions of controlling the driving frequency of the hot water unit side compressor 42 and controlling the opening degree of the hot-water-supply-refrigerant-block side expansion device 44.

The air-conditioning hot-water supply combined system A may further include, not illustrated, a sensor that detects a discharge pressure of the air conditioning refrigerant, a sensor that detects a suction pressure of the air conditioning refrigerant, a sensor that detects a discharge temperature of the air conditioning refrigerant, a sensor that detects a suction temperature of the air conditioning refrigerant, sensors that detect temperatures of the air conditioning refrigerant flowing into and out of the heat source side heat exchanger 13*a*, a sensor that detects a temperature of outside air taken into the heat source unit 10, sensors that detect temperatures of the air conditioning refrigerant flowing into and out of each load side heat exchanger 31, and a sensor that detects a temperature of water stored in the hot water storage tank (not illustrated). Information (measurement information 312, such as temperature information and pressure information) obtained by these various sensors is transmitted to the control means 300 and is used to control each actuator.

First, a control process in the cooling main operation mode will be described.

In order to converge an evaporating temperature in the air conditioning refrigerant block 100 to an arbitrarily set target value, the heat-source-unit control means 310 performs control by changing a driving frequency of the compressor 11, which is a part of a control command 311. Moreover, in order to converge a condensing temperature in the air conditioning refrigerant block 100 to an arbitrarily set target value, the heat-source-unit control means 310 performs control by changing the heat exchange capacity of the heat source side heat exchanger 13*a*, which is a part of the control command 311. Furthermore, the control command 311 is determined on the basis of the measurement information 312 obtained from the heat source unit 10.

Description will be made on the assumption that the heat-source-unit control means 310 and the hot-water-unit control means 340 perform control, for example, independently of each other. During the cooling main operation, when all of the operating load side unit 30 is in cooling operation and when the hot water load is smaller than a predetermined reference value, that is, when the load on the condensing side in the air conditioning refrigerant block 100 is smaller than the predetermined reference value, maintaining the target value of the condensing temperature high will increase the input of the compressor, and, as a result, will lead to execution of an operation that is not highly efficient.

The predetermined reference value may be, for example, the calculated difference between an inlet water temperature of the hot water unit 40 and a set temperature or difference between an outlet water temperature thereof and a set temperature, the calculated difference between a rated capacity of the hot water unit 40 and a hot water supply capacity calculated from a refrigeration cycle using pressure sensors and temperature sensors in the hot water supply refrigerant block 200, the sensors being not illustrated, or the ratio of an operating capacity of the hot water unit 40 (for example, the total operating capacity of the operating hot water units 40 being calculated through multiplication of a capacity of each hot water unit 40 by the number of operating hot water units 40) to an operating capacity of the load side unit 30 performing the cooling operation. Alternatively, the predetermined reference value may be a combination of the above.

As regards this problem, in the air-conditioning hot-water supply combined system A, a target condensing temperature for the air conditioning refrigerant block 100 is reduced in the air conditioning refrigerant block 100 (refer to FIG. 2(*b*)), so that an input of the compressor 11 can also be reduced. Reducing the target condensing temperature in the air conditioning refrigerant block 100 can be achieved by increase of, for example, the heat exchange capacity of the heat source unit 10 (specifically, the heat source side heat exchanger 13*a*).

Furthermore, as regards a target value of the target condensing temperature to be reduced, for example, a target condensing temperature during the cooling only operation may be desirably set as the target value.

Meanwhile, in the air-conditioning hot-water supply combined system A, a reduction in evaporating capacity in the hot water supply refrigerant block 200 leads to a reduction in circulation amount of refrigerant flowing through the circuit block. Accordingly, a driving frequency of the hot water unit side compressor 42 is increased in order to maintain a condensing capacity (hot water supply capacity). This results in an increase in input of the hot water unit side compressor 42 (refer to FIG. 2(*a*)).

As regards the capacity of the compressor 11 in the air conditioning refrigerant block 100, a capacity greater than or equal to that of the hot water unit side compressor in the hot water supply refrigerant block 200 is typically selected. Accordingly, as regards inputs of the compressors (the compressor 11, the hot water unit side compressor 42), the input of the compressor 11 is often dominant. In the air-conditioning hot-water supply combined system A, input of the system is reduced, and as a result, the COP of the system is improved.

It is desirable to set the criteria for reducing the condensing temperature in the air conditioning refrigerant block 100 to the time when a cooling load is detected to be higher than a condensing load in the air conditioning refrigerant block 100. For example, during the cooling main operation mode, when all of the load side units 30 are in cooling operation and only the hot water unit 40 is operating as a condenser, the above-described condition is uniquely satisfied. Even if the load side unit 30 is operating as a condenser (heating operation), a condition in which the difference between the suction temperature of the load side unit 30 and a set temperature is detected to be small may also be set as a criteria for reducing the condensing temperature in the air conditioning refrigerant block 100.

Figure 3:
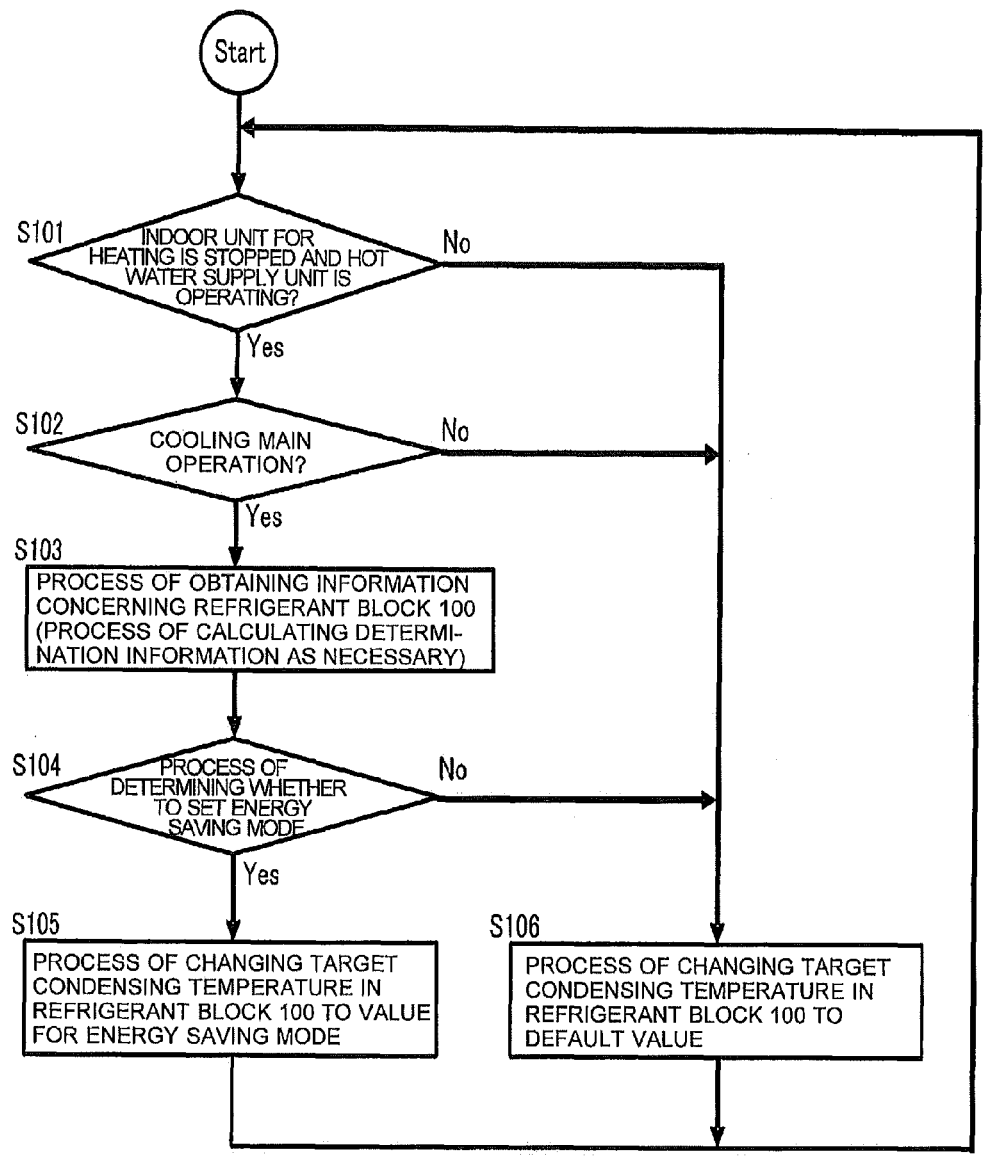
FIG. 3 is a flowchart illustrating the flow of a control process performed by the air-conditioning hot-water supply combined system during a cooling main operation.

FIG. 3 is a flowchart schematically illustrating a flow of a control process performed by the air-conditioning hot-water supply combined system A during the cooling main operation. The flow of the control process performed by the air-conditioning hot-water supply combined system A during the cooling main operation will be described with reference to FIG. 3. Furthermore, the control process will be described later in more detail with reference to FIG. 5.

The control means 300 determines whether the load side heat exchanger 31 functioning as a condenser in the load side unit 30 is suspended and only the hot water unit 40 is operating (step S101). When determining that the load side heat exchanger 31 functioning as a condenser in the load side unit 30 is suspended and only the hot water unit 40 is operating (step S101; Yes), the control means 300 determines whether the cooling main operation is being performed (step S102). When determining that the cooling main operation is being performed (step S102; Yes), the control means 300 obtains information of the air conditioning refrigerant block 100 necessary for calculation (step S103). Note that in step S103, a parameter (determination information) to be compared to a predetermined reference value is calculated as necessary.

Then, the control means 300 conducts comparison with the predetermined reference value to determine whether to set to an energy saving mode (step S104). When determining to set to the energy saving mode (step S104; Yes), the control means 300 reduces a target condensing temperature in the air conditioning refrigerant block 100 (step S105).

Whereas, when determining that the load side heat exchanger 31 functioning as a condenser in the load side unit 30 is suspended and not only the hot water unit 40 is operating (step S101; No), when determining that the cooling main operation is not being performed (step S102; No), or when determining not to set to the energy saving mode (step S104; No), the control means 300 returns the target condensing temperature to its original value (step S106). Such a series of control processing steps may be sequentially performed at arbitrarily determined time intervals or each time when the number of operating units is changed.

Figure 5:
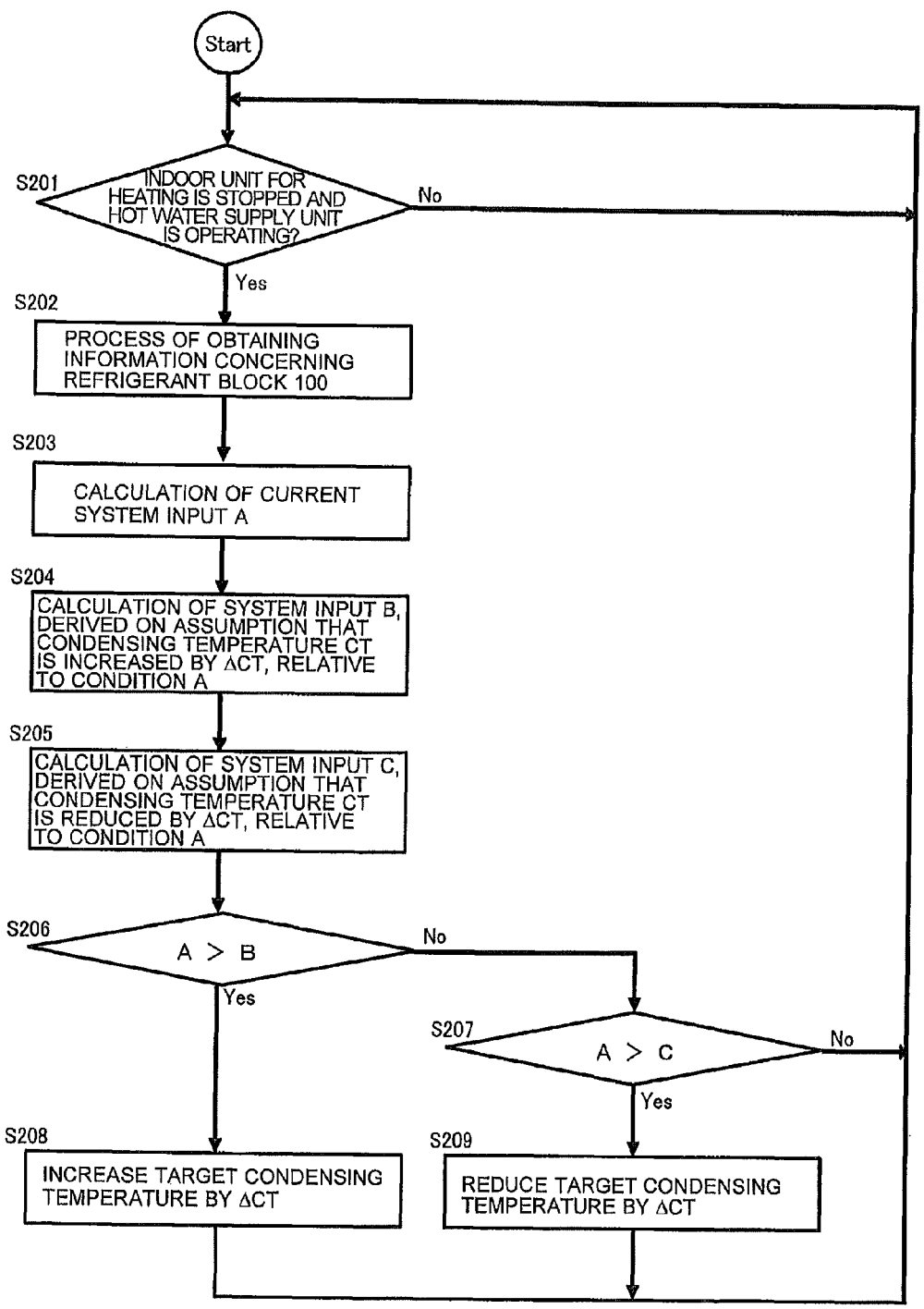
FIG. 5 is a flowchart illustrating the flow of a control process performed by the air-conditioning hot-water supply combined system during a heating main cooling operation.

FIG. 5 is a flowchart illustrating the flow of the control process performed by the air-conditioning hot-water supply combined system A during the cooling main operation in more detail. The flow of the control process performed by the air-conditioning hot-water supply combined system A during the cooling main operation will be described with reference to FIG. 5. Furthermore, while FIG. 5 illustrates the control process during the cooling main operation, description regarding this process can be applied to a control process during a heating operation.

The control means 300 determines whether the load side heat exchanger 31 functioning as a condenser in the load side unit 30 is suspended and only the hot water unit 40 is operating (step S201). When determining that the load side heat exchanger 31 functioning as a condenser in the load side unit 30 is suspended and only the hot water unit 40 is operating (step S201; Yes), the control means 300 obtains information of the air conditioning refrigerant block 100 necessary for calculation (step S202).

Then, the control means 300 calculates the current input (A) (step S203). The control means 300 calculates a predicted input value (B), derived on the assumption that the condensing temperature is increased by $\Delta CT$, relative to the current input (step S204). The control means 300 calculates a predicted input value (C), derived on the assumption that the condensing temperature is reduced by $\Delta CT$, relative to the current input (A) (step S205). Then, the control means 300 compares the current input (A) with the predicted input value (B) (step S206). When determining that the current input (A) is greater than the predicted input value (B) (step S206; Yes), the control means 300 increases the target condensing temperature by $\Delta CT$ (step S208).

Whereas, when determining that the current input (A) is less than or equal to the predicted input value (B) (step S206; No), the control means 300 compares the current input (A) with the predicted input value (C) (step S207). When determining that the current input (A) is greater than the predicted input value (C) (step S207; Yes), the control means 300 reduces the target condensing temperature by $\Delta CT$ (step S209). Such a series of control processing steps may be sequentially performed at arbitrarily determined time intervals or each time when the number of operating units is changed.

Next, a control process in the heating only operation mode or the heating main operation mode will be described.

In order to converge a condensing temperature in the air conditioning refrigerant block 100 to an arbitrarily set target value, the heat-source-unit control means 310 performs control by changing a driving frequency of the compressor 11, which is a part of a control command 311. Moreover, in order to converge an evaporating temperature in the air conditioning refrigerant block 100 to an arbitrarily set target value, the heat-source-unit control means 310 performs control by changing the heat exchange capacity of the heat source side heat exchanger 13a, which is a part of the control command 311. Furthermore, the control command 311 is determined on the basis of the measurement information 312 obtained from the heat source unit 10.

Description will be made on the assumption that the heat-source-unit control means 310 and the hot-water-unit control means 340 perform control, for example, independently of each other. During the heating only operation mode or the heating main operation mode, when the hot water supply unit is operating and a hot water supply load is low and when a configuration is such that an input of the heat source unit 10 is dominant (for example, when an air-cooled heat source unit is used), maintaining the target value of the condensing temperature high will increase the input of the compressor 11 and, as a result, will lead to execution of an operation that is not highly efficient.

As regards this problem, in the air-conditioning hot-water supply combined system A, a target condensing temperature for the air conditioning refrigerant block 100 is controlled in the air conditioning refrigerant block 100 (refer to FIG. 2(b)), so that an input of the system (the sum of an input of the compressor 11 and an input of the compressor in the hot water unit 40) can be reduced. Control of the target condensing temperature in the air conditioning refrigerant block 100 can be achieved by change of, for example, the driving frequency of the heat source unit 10 (specifically, the condenser 1).

As regards a method of changing the target condensing temperature, various load patterns may be expected depending on the condition of the temperature load of the air-conditioning hot-water supply combined system A. As illustrated in FIG. 5, at a given time interval, after the calculation of an input of the air conditioning refrigerant block 100 and an input of the hot water supply refrigerant block 200, the added sum (i.e., the system input) is compared with a calculated value of the system input derived on the assumption that the condensing temperature of the air conditioning refrigerant block 100 is increased or reduced by an arbitrarily set change rate of condensing temperature. If the system input is reduced, the target condensing temperature is increased or reduced by the change rate of condensing temperature. In this manner, feedforward control based on a predicted system input may be performed.

Figure 4:
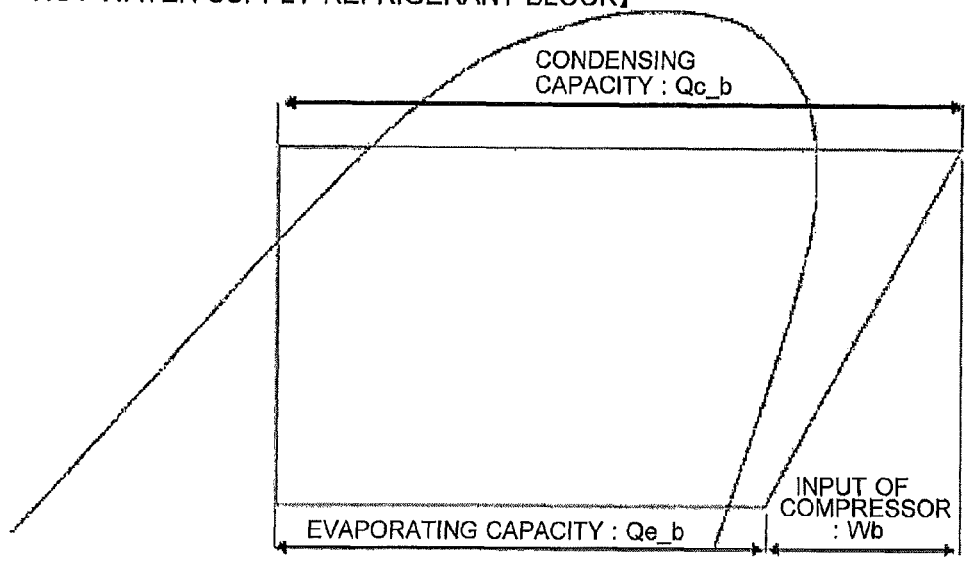
FIG. 4 includes a p-h diagram illustrating transition of a refrigerant state in an air conditioning refrigerant block and a p-h diagram illustrating the same in a hot water supply refrigerant block.
Figure 4:
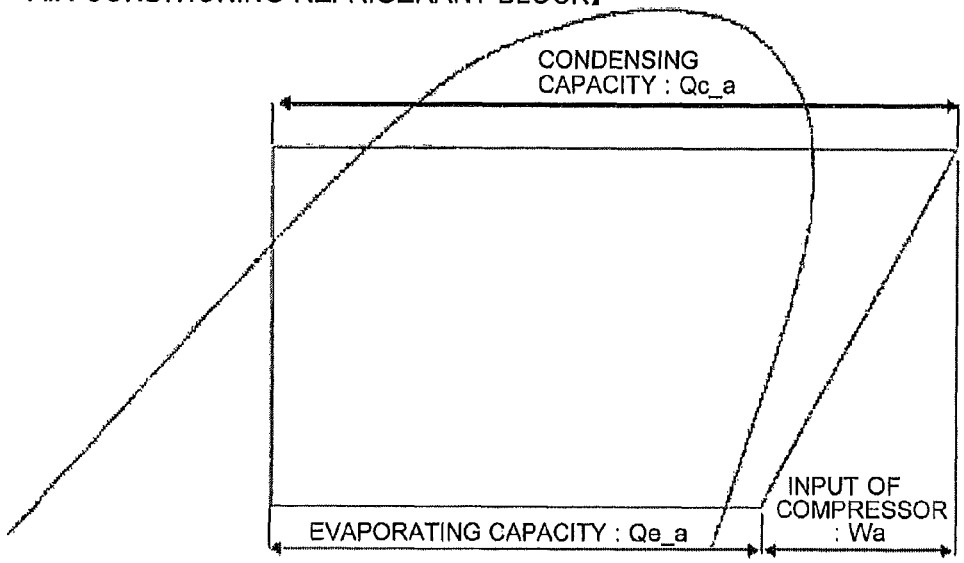

FIG. 4 includes a p-h diagram illustrating transition of a refrigerant state in an air conditioning refrigerant block 100 and a p-h diagram illustrating the same in a hot water supply refrigerant block 200. The concept of the control carried out by the control means 300 will be described based on the technical ideas and with reference to FIG. 4.

Referring to FIG. 4, when Qc_b denotes a hot water supply capacity of the hot water unit 40, Qe_b denotes an evaporating capacity of the hot water unit 40, and Wb denotes an input of the hot water unit, the relationship of Qc_b=Qe_b+Wb holds. When Wall denotes the total input of the system and Wa denotes an input of the refrigerant block 100, the input Wb is equal to the difference between the hot water supply capacity Qc_b of the hot water unit and the evaporating capacity of the hot water unit 40 on the condition that inverter loss and oil loss are eliminated. Thus, the relationship of Wall=Wa+Wb=Wa+(Qc_b−Qe_b) holds.

In this case, as regards reduction of the system input Wall, while not reducing the hot water supply capacity (Qc_b=constant), so long as the difference between Wall before and after its change is below 0, the hot water supply capacity in the system is kept constant and the system input is reduced. In this way, the COP of the system can be reduced.

Parameters necessary to calculate Wall before and after its change include, for example, Wa, Qc_b, and Qe_b. For example, if Qc_b were to be kept constant, information regarding Wa and Qe_b before and after the change will be enough for the calculation.

Qe_b can be calculated from the condensing capacity of the air conditioning refrigerant block 100 because heat discharged from the air conditioning refrigerant block 100 is directly received by the refrigerant-to-refrigerant heat exchanger 41. The condensing capacity can be calculated on the basis of the circulation amount Gr of refrigerant flowing into the refrigerant-to-refrigerant heat exchanger 41 and the difference between enthalpy at a point before the refrigerant-to-refrigerant heat exchanger 41 and enthalpy at a point after the refrigerant-to-refrigerant heat exchanger 41.

The refrigerant circulation amount Gr can be calculated on the basis of information in the air conditioning refrigerant block 100a including a condensing temperature, an evaporating temperature, a compressor discharge temperature or compressor suction temperature, and the opening degree of the expansion device 45. The enthalpy difference can be calculated on the basis of a pressure, a gas piping temperature, and a liquid piping temperature in the refrigerant-to-refrigerant heat exchanger 41.

A refrigerant which can be used in the air conditioning refrigerant block 100 and the hot water supply refrigerant block 200 will now be described. Examples of the refrigerant which can be used in the refrigeration cycles in the air conditioning refrigerant block 100 and the hot water supply refrigerant block 200 include a non-azeotropic refrigerant mixture, a near-azeotropic refrigerant mixture, and a single refrigerant. Examples of the non-azeotropic refrigerant mixture include R-407C (R32/R125/R134a) that are HFC (hydrofluorocarbon) refrigerants. This non-azeotropic refrigerant mixture is a mixture of refrigerants having different boiling points and, therefore, has such characteristics that the composition ratio of a liquid phase refrigerant to a gas phase refrigerant differs. Examples of the near-azeotropic refrigerant mixture include R410A (R32/R125) and R404A (R125/R143a/R134a), which are HFC refrigerants. Such a near-azeotropic refrigerant mixture has such characteristics that its operating pressure is approximately 1.6 times as high as that of R22 in addition to the characteristics similar to those of the non-azeotropic refrigerant mixture.

Furthermore, examples of the single refrigerant include R22 that is an HCFC (hydrochlorofluorocarbon) refrigerant and R134a that is an HFC refrigerant. Such a single refrigerant has such characteristics that it is easy to handle because it is not a mixture. In addition, any natural refrigerants including carbon dioxide, propane, isobutane, and ammonia can be used. Note that R22 is chlorodifluoromethane, R32 is difluoromethane, R125 is pentafluoroethane, R134a is 1,1,1,2-tetrafluoroethane, and R143a is 1,1,1-trifluoroethane. A refrigerant according to the application or use of the air conditioning refrigerant block 100 and the hot water supply refrigerant block may therefore be used.

Since the air conditioning refrigerant block 100 and the hot water supply refrigerant block 200 are configured to have individual refrigerant circuits as described above, the same or different kinds of refrigerants may be used as refrigerants to be circulated through the refrigerant circuits. Furthermore, in the case where a refrigerant having a low critical temperature is used as a hot water supply refrigerant, it is assumed that the hot water supply refrigerant enters a supercritical state while transferring heat in the water heat exchanger 43 for high-temperature water supply. Typically, when a refrigerant is in a supercritical state while transferring heat, the COP varies significantly due to change in radiator pressure or radiator outlet temperature. In order to perform an operation achieving high COP, higher-level control is needed. Whereas, typically, the saturation pressure of a refrigerant having a low critical temperature is high at the same temperature. The wall thickness of each piping or compressor therefore has to be increased. This results in increase of cost.

In view of the fact that a temperature of water stored in the hot water storage tank (not illustrated) is recommended to be set at or above 62 degrees C. in order to suppress breeding of Legionella, it is assumed that a target temperature of hot water supply is often set at or above at least 62 degrees C. A refrigerant having a critical temperature at or above at least 62 degrees C. is used as a hot water supply refrigerant on the basis of the above-described fact. The reason why such a refrigerant is used as a hot water supply refrigerant in the hot water supply refrigerant block 200 is that high COP can be more stably achieved with lower cost.

Further, although the case where excess refrigerant is stored in the receiver (the accumulator 15) in the air conditioning refrigerant block 100 is illustrated, the configuration is not limited to this one. If excess refrigerant is allowed to be stored in a heat exchanger that serves as a radiator in the refrigeration cycle, the accumulator 15 may be omitted. Furthermore, although FIG. 1 illustrates the case in which the number of connected load side units 30 is two or more, the number of connected units is not particularly limited. For example, one or more load side units 30 may be connected. In the case where a plurality of load side units 30 are arranged, the load side units 30 may have the same capacity or different capacities from large to small.

As described above, in the air-conditioning hot-water supply combined system A according to Embodiment, in the case where all of the load side units 30 perform the cooling operation and the hot water load is less than the predetermined reference value during the cooling and heating mixed operation (in the cooling main operation mode) in the cooling cycle, an input of the air conditioning refrigerant block 100 is reduced, enabling the COP of the system to be increased.

REFERENCE SIGNS LIST 1 high pressure main piping; 2 low pressure main piping; 3a liquid branch piping; 3b liquid branch piping; 3c liquid branch piping; 4a gas branch piping; 4b gas branch piping; 4c gas branch piping; 5 gas piping; 6 gas piping; 7 liquid piping; 8 liquid piping; 10 heat source unit; 11 compressor; 12 four-way valve; 13a heat source side heat exchanger; 13b air-sending device; 14a check valve; 14b check valve; 14c check valve; 14d check valve; 15 accumulator; 20 cooling/heating branch unit; 21 gas-liquid separator; 22 expansion device; 23 bypass expansion device; 24a solenoid valve; 24b solenoid valve; 24c solenoid valve; 30 load side unit; 30a load side unit; 30b load side unit; 31 load side heat exchanger; 31a load side heat exchanger; 31b load side heat exchanger; 32 load side expansion device; 32a load side expansion device; 32b load side expansion device; 40 hot water unit; 41 refrigerant-to-refrigerant heat exchanger; 42 hot water unit side compressor; 43 water heat exchanger; 44 hot-water-supply-refrigerant-block side expansion device; 45 air-conditioning-refrigerant-block side expansion device; 46 water circuit; 100 air conditioning refrigerant block; 130 first connecting piping; 131 second connecting piping; 200 hot water supply refrigerant block; 300 control means; 310 heat-source-unit control means; 311 control command; 312 measurement information; 320 cooling/heating-branch-unit control means; 330 load-side-unit control means; 330a load-side-unit control means; 330b load-side-unit control means; 340 hot-water-unit control means; 350 communication means; and A air-conditioning hot-water supply combined system.

The invention claimed is:

1. An air-conditioning hot-water supply combined system, comprising:
   at least one heat source unit including at least a heat source side compressor and a heat source side heat exchanger;
   a plurality of load side units connected in parallel to the heat source unit, the load side units each including at least a load side heat exchanger;

a hot water unit connected in parallel to the heat source unit, the hot water unit including at least a refrigerant-to-refrigerant heat exchanger, a water heat exchanger, and a hot water unit side compressor; and at least one relay unit disposed between the heat source unit, and the load side units and the hot water unit, the relay unit being configured to transfer heating energy or cooling energy generated in the heat source unit to the load side units and the hot water unit;

a controller configured to: calculate a current input (A) which is a sum of a current input of the heat source side compressor and a current input of the hot water unit side compressor; calculate a first predicted input value (B) which is derived on a predetermined association that a condensing temperature is increased by $\Delta CT$ relative to the current input (A); and calculate a second predicted input value (C) which is derived on a predetermined association that the condensing temperature is reduced by $\Delta CT$ relative to the current input (A), wherein in a cooling main operation mode in which a cooling load is higher than a heating load and the hot water unit is operated, in a case where the current input (A) is larger than the first predicted input value (B), the controller increases a target condensing temperature of the heat source unit by $\Delta CT$, and in a case where a current input (A), which is a sum of a current input of the condensing temperature is increased by $\Delta CT$ relative to the current input (A), a target in a case where the current input (A) is less than or equal to the first predicted input value (B), and the current input (A) is larger than the second predicted input value (C), the controller reduces the target condensing temperature of the heat source unit by $\Delta CT$.

2. The air-conditioning hot-water supply combined system of claim 1, wherein a heat exchange capacity of the heat source side heat exchanger is increased to reduce the target condensing temperature in the heat source unit.

3. The air-conditioning hot-water supply combined system of claim 1, wherein the heat source side compressor has a capacity greater than or equal to a capacity of the hot water unit side compressor, and the target condensing temperature in the heat source unit is reduced in order to reduce an input of the heat source side compressor and increase an input of the hot water unit side compressor.

* * * * *